April 10, 1962   R. W. SANDERSON ETAL   3,028,716
FLUID SEPARATOR
Filed Feb. 12, 1957

R. W. SANDERSON
W. J. PAYNE
A. F. PURCHIS
INVENTORS.

BY
ATTORNEYS

United States Patent Office 3,028,716
Patented Apr. 10, 1962

3,028,716
FLUID SEPARATOR
Robert W. Sanderson and Allen F. Purchis, Detroit, and William J. Payne, Livonia, Mich., assignors to Ford Motor Company, Dearborn, Mich., a corporation of Delaware
Filed Feb. 12, 1957, Ser. No. 639,659
2 Claims. (Cl. 55—203)

This invention pertains to means for separating fluids having different specific gravities, and more particularly to means for separating gases from liquids in an automotive cooling system.

The trend toward lower motor cars has suggested a shift to lower radiators. The lower placement of the radiator to accomplish the objective of a lower hood line increases the chance of air becoming trapped in the engine's cooling system. Since air has very poor heat conducting properties, it is desirable to remove all or most of the air from the coolant. This invention accomplishes this purpose by imparting to the mixture of air and coolant a rotary motion, thus collecting the air near the vortex of this motion, and by placing a tube in communication with this region of low angular velocity for the purpose of drawing off the air. In order to cause the air-rich mixture to flow outwardly through said tube, we employ a means for causing an increased static pressure in the region of the rotating fluid mixture. The air-receiving tube is conveniently placed in communication with a receiving tank on the radiator, where the air may be safely trapped and prevented from returning to the circulating system.

Our invention also provides a coolant reserve which continuously and automatically replaces any loss of coolant as the vehicle is operated, thereby assuring that the cooling system remains fully operative to the full extent of the reserve.

It is, therefore, an object of our invention to provide a means for separating air from water in an automotive type cooling system.

A further object is to provide a separator which permits the employment of a cross-flow radiator.

Another object is to eliminate the elevated air-trap tanks presently employed in cross-flow radiator designs.

A still further object is to provide a coolant reserve for a motor vehicle and a means for continuously and automatically replacing any loss of coolant as the vehicle is operated.

Further objects and advantages of this invention will become apparent from the following description of a specific embodiment in which.

Figure 1:
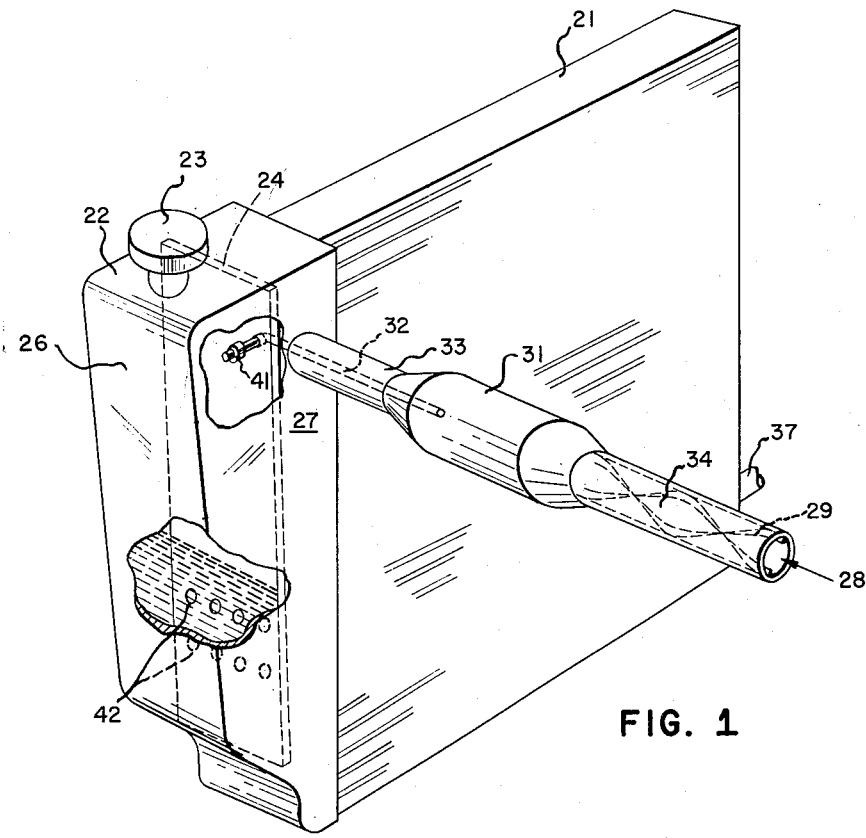
FIGURE 1 is a pictorial view partially broken away of an air separator connected to a cross flow radiator.

In FIGURE 1 is seen radiator 21 with intake header or compartment 22. Divider 24 extends from the top of compartment 22 downward, forming thereby an air portion 26 and a water portion 27. Each portion is in communication with the other by a series of passageways 42 formed in and near the bottom of divider 24. A filler cap 23 connects to the air portion 26 of compartment 22.

Figure 2:
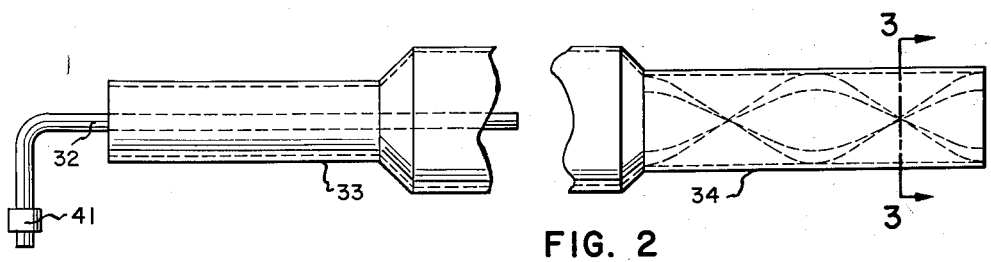
FIGURE 2 is a plan elevational view broken away and partially schematic of the air separator.
Figure 3:
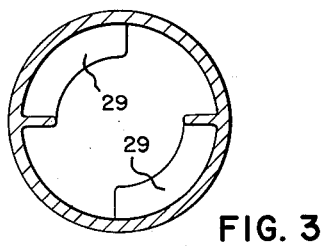
FIGURE 3 is a section taken at numeral 3—3 of FIGURE 2 showing the spiraling fins.

Air mixed with water enters tube 28 from the motor block and a spiral motion is imparted thereon by fins 29. The spiraling water and air mixture enters separating chamber 31 where the air tends to collect near the axis of the chamber. Tube 32 is positioned substantially along the axis of chamber 31 and is in communication with air portion 26 of tank 22. Check valve 41 permits flow into air portion 26 and prevents reverse flow so that during the time that the engine is inoperative, air will not flow back into the cooling system. A water outlet tube 33 communicating with chamber 31 has a smaller diameter than does inlet tube 28 thereby creating a static pressure head in chamber 31 which induces the lighter fluid in the center of chamber 31 to flow into tube 32. FIGURE 2 shows this size differential more clearly. Also, the kinetic force of such water as may be mixed with the air impinging on the opening of tube 32 assists in moving the air-rich mixture through tube 32 and into portion 26.

In the operation of this device air entrapped in water is received in the tube 28 from the engine block under pressure of the water pump, not shown. Spiral means 29 may be guides, or any other means to induce the water to spiral, and is located on the intake side of chamber 31. Water, upon reaching chamber 31, will be forced to the walls while the bubbles of air being less dense will be forced to the center. The pressure gradient is created across the separator in this case by making orifice 33 smaller than orifice 34 which, by the operation of the water pump, not shown, creates more pressure at the chamber 31 end of tube 32 than at the air portion 26 end of the tube. This causes the air-rich mixture to pass through the tube into air portion 26. Water which passes through tube 32 will be added to the system supply. Water then travels horizontally across radiator 21 through one of the many horizontal tubes and back into the engine cooling block at outlet 37.

It can be seen that the air portion 26 of compartment 22 can have any convenient capacity, and when filled with coolant, will provide a reserve capacity for the cooling system. As losses to the coolant occur, as due to evaporation or otherwise, our invention operates to continuously maintain the system free from air to the extent of the amount of reserve coolant above passageways 42.

A device built according to the teachings of this invention for a 17-quart automotive cooling system had the following dimensions:
  Inlet tube 28 diameter, 1½ inches
  Separating chamber 31 diameter, 2¼ inches
  Outlet tube 33 diameter, 1¼ inches
  Separating chamber length from tube 28 to tube 33, 5 inches With a minimum flow of 10 gallons per minute, corresponding to engine speed at idle, a noticeable amount of air was removed after one minute of operation. An entire charge of one quart of air was removed after 30 minutes of operation.

What we claim and desire to secure by United States Letters Patent is:

1. An improved cooling system for water pump-operated, liquid cooled automotive engines comprising a radiator core having horizontal cooling tubes, a header on one side of said core into which said tubes open, a partition in said header dividing the header into a first compartment remote from said core and a second compartment near said core with communication between said compartments at a point relatively low in said header, a centrifugal degasifier having an inlet connected to receive coolant from the water pump and a liquid outlet connected to discharge into said second compartment and having an air outlet, a one-way air valve, said air outlet connected to discharge into said first compartment through said valve.

2. A cooling system for a liquid cooled automotive engine comprising a radiator core having horizontal cooling tubes, a header on one side of said core into which said tubes open, a partition in said header dividing the header into a first compartment remote from said core and a second compartment near said core with communication between said compartments relatively low in said header, a centrifugal degasifier having an inlet connected to receive liquid from said engine, said centrifugal degasifier having a liquid outlet connected to discharge into said second compartment and having an air outlet connected to discharge into said first compartment.

References Cited in the file of this patent

UNITED STATES PATENTS

| | | |
|---|---|---|
| 1,576,756 | Muir | Mar. 16, 1926 |
| 2,316,729 | Tryon | Apr. 13, 1943 |

FOREIGN PATENTS

| | | |
|---|---|---|
| 522,765 | Belgium | Sept. 30, 1953 |
| 164,393 | Australia | July 29, 1955 |